(12) United States Patent
Tharippala et al.

(10) Patent No.: US 10,002,067 B2
(45) Date of Patent: Jun. 19, 2018

(54) SYSTEMS AND METHODS FOR PERFORMING INTEGRATION TESTING OF AN INFORMATION TECHNOLOGY (IT) INFRASTRUCTURE

(71) Applicant: Wipro Limited, Bangalore (IN)

(72) Inventors: Prasad Tharippala, Bangalore (IN); Arpitha Honne Gowda, Mysore (IN); Chinmay Manjunath, Bangalore (IN); Ramprasad Jandhyala, Bangalore (IN)

(73) Assignee: Wipro Limited, Bangalore (IN)

( * ) Notice: Subject to any disclaimer, the term of this patent is extended or adjusted under 35 U.S.C. 154(b) by 56 days.

(21) Appl. No.: 15/180,497

(22) Filed: Jun. 13, 2016

(65) Prior Publication Data

US 2017/0315904 A1    Nov. 2, 2017

(30) Foreign Application Priority Data

Apr. 28, 2016  (IN) ............................... 20164104762

(51) Int. Cl.
| | | |
|---|---|---|
| *G06F 9/44* | (2018.01) | |
| *G06F 11/36* | (2006.01) | |
| *H04L 29/12* | (2006.01) | |
| *H04L 12/26* | (2006.01) | |
| *H04L 29/08* | (2006.01) | |

(52) U.S. Cl.
CPC .......... *G06F 11/3672* (2013.01); *H04L 43/50* (2013.01); *H04L 61/2007* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,972,941 B2 | 3/2015 | DeJana et al. | |
| 2015/0052402 A1* | 2/2015 | Gurumurthy | ....... G06F 11/3688 714/38.1 |
| 2016/0050108 A1 | 2/2016 | Baughman et al. | |

FOREIGN PATENT DOCUMENTS

WO    2013072232 A1    5/2013

* cited by examiner

*Primary Examiner* — Qamrun Nahar
(74) *Attorney, Agent, or Firm* — LeClairRyan PLLC (57) ABSTRACT

Systems and methods for performing integration testing of an Information Technology (IT) infrastructure are disclosed. In one embodiment, the method comprises receiving one or more infrastructure parameters from at least one data source. The method further comprises identifying at least one infrastructure element by analyzing the one or more infrastructure parameters. The method further comprises determining an infrastructure landscape by performing at least one validation operation on the at least one infrastructure element. The infrastructure landscape indicates a topology of the at least one infrastructure element in the IT infrastructure. The method further comprises selecting one or more agnostic test cases from a test case repository based on the infrastructure landscape. The method further comprises executing the one or more agnostic test cases to perform integration testing of the IT infrastructure.

18 Claims, 4 Drawing Sheets

SYSTEMS AND METHODS FOR PERFORMING INTEGRATION TESTING OF AN INFORMATION TECHNOLOGY (IT) INFRASTRUCTURE

This application claims the benefit of Indian Provisional Patent Application Serial No. 20164104762, filed Apr. 28, 2016, which is hereby incorporated by reference in its entirety.

FIELD

This disclosure relates generally to integration testing and more particularly to systems and methods for performing integration testing of an Information Technology (IT) infrastructure.

BACKGROUND

Typically, private-cloud, datacenters and various public cloud vendors offer multiple infrastructure solutions but these are not free of failures while hosting real-time applications. The infrastructure solutions may involve many highly complicated data center solutions with variety of storage, network and computing systems. In such cases, it becomes very difficult to perform integration testing of an infrastructure due to the presence of various infrastructure devices, also referred to as infrastructure elements, with various operating systems from multiple vendors. Failures in the infrastructure may cause unexpected downtimes resulting into huge revenue losses. Infrastructure failures cause real-time applications to go offline. Qualifying them against infrastructure failures individually across multiple vendors is a painstaking effort.

There are many common test scenarios that need to get executed on datacenters and cloud infrastructures across networking, storage and compute. Thus, the typical technical problems faced are unexpected downtimes caused by applications going offline due to infrastructure failures like ELB failure, VM instance termination, DR site failure (induced by a disaster) or overload of incoming traffic. Therefore, it is pertinent to test the infrastructure to avoid such failures. Typically, individual automation tools will have the similar logic coded and hence maintenance of same logic will be complex. Further, complex test setups interfacing with multiple OEMs and scenarios, may lead to wrong procedures and wrong test flows. Typically, conventional frameworks may not be able to talk to various infrastructure elements like physical switches, Storage servers, cloud storage etc. Thus, there is a need for an optimized solution, which can help to comprehensively test the infrastructure.

SUMMARY

In one embodiment, method for performing integration testing of an Information Technology (IT) infrastructure is disclosed. The method comprises receiving one or more infrastructure parameters from at least one data source. The method further comprises identifying at least one infrastructure element by analyzing the one or more infrastructure parameters. The method further comprises determining an infrastructure landscape by performing at least one validation operation on the at least one infrastructure element. The infrastructure landscape indicates a topology of the at least one infrastructure element in the IT infrastructure. The method further comprises selecting one or more agnostic test cases from a test case repository based on the infrastructure landscape. The method further comprises executing the one or more agnostic test cases to perform integration testing of the IT infrastructure.

In another embodiment, a system for performing integration testing of an Information Technology (IT) infrastructure is disclosed. The system includes at least one processors and a computer-readable medium. The computer-readable medium stores instructions that, when executed by the at least one processor, cause the at least one processor to perform operations comprising receiving one or more infrastructure parameters from at least one data source. The operations further comprise identifying at least one infrastructure element by analyzing the one or more infrastructure parameters. The operations further comprise determining an infrastructure landscape by performing at least one validation operation on the at least one infrastructure element. The infrastructure landscape indicates a topology of the at least one infrastructure element in the IT infrastructure. The operations further comprise selecting one or more agnostic test cases from a test case repository based on the infrastructure landscape. The operations further comprise executing the one or more agnostic test cases to perform integration testing of the IT infrastructure.

In yet another embodiment, a non-transitory computer-readable storage medium for performing integration testing of an Information Technology (IT) infrastructure is disclosed, which when executed by a computing device, cause the computing device to perform operations comprising receiving one or more infrastructure parameters from at least one data source. The operations further comprise identifying at least one infrastructure element by analyzing the one or more infrastructure parameters. The operations further comprise determining an infrastructure landscape by performing at least one validation operation on the at least one infrastructure element. The infrastructure landscape indicates a topology of the at least one infrastructure element in the IT infrastructure. The operations further comprise selecting one or more agnostic test cases from a test case repository based on the infrastructure landscape. The operations further comprise executing the one or more agnostic test cases to perform integration testing of the IT infrastructure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Working of the systems and methods for performing integration testing of an IT infrastructure is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
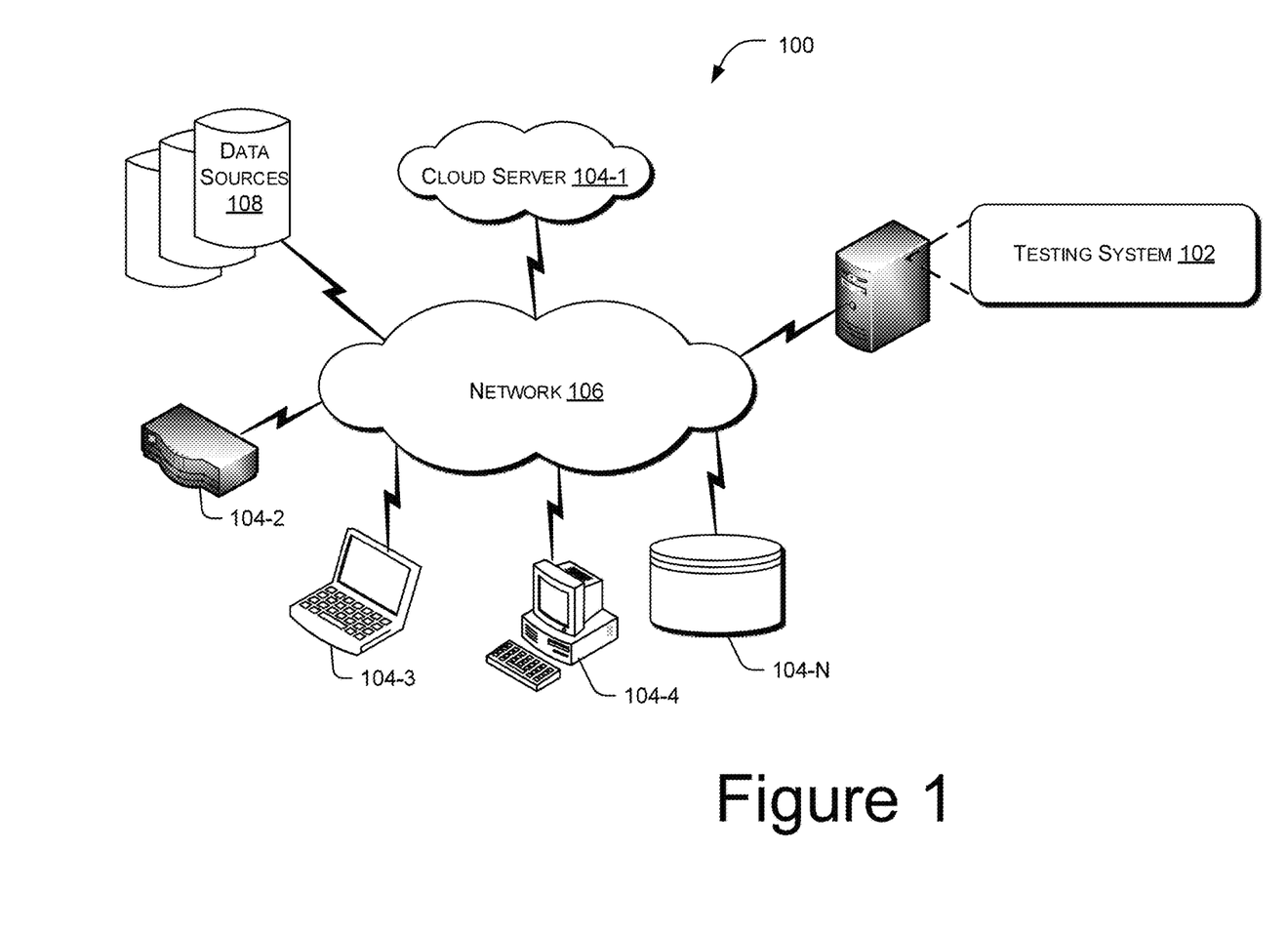
FIG. 1 illustrates an exemplary network environment comprising a testing system for performing integration testing of an IT infrastructure, in accordance with some embodiments of the present disclosure.

FIG. 1 illustrates an exemplary network environment 100 comprising a testing system or testing computing device 102 for performing integration testing of an IT infrastructure, in accordance with some embodiments of the present disclosure. The IT infrastructure may be understood as collection of various devices to run one or more applications. The devices are typically reoffered to as infrastructure elements in the IT infrastructure. Examples of the infrastructure elements may include cloud server, computing devices with operating systems, switches, routers, servers, and databases. The infrastructure element work independently and/or in conjunction to make an application run in the IT infrastructure. The testing system 102 performs integration testing on the IT infrastructure to detect failure/faults in the IT infrastructure. The testing system 102 may be implemented on one of the computing systems. The computing systems may include a laptop computer, a desktop computer, a notebook, a workstation, a mainframe computer, a server, a network server, and the like. Architecture of the testing system 102 is discussed in more detail in conjunction with FIG. 2.

As shown in FIG. 1, the network environment 100 comprises various infrastructure elements, such as a cloud server 104-1, a router 104-2, a laptop 104-3, a desktop computer 104-4, and a database 104-N. Hereinafter, infrastructure elements may be individually referred to as an infrastructure element 104 and collectively referred to as infrastructure elements 104. It may be noted that the infrastructure elements 104 shown in FIG. 1 are exemplary and there may be other infrastructure elements 104 may also be present in the IT infrastructure without deviating from scope of the present subject matter.

The infrastructure elements 104 are communicatively coupled with each other and with the testing system 102 through a network 106. The network 106 may comprise, a variety of computing devices, a collection of hardware, software, services, and/or resources that can be invoked to instantiate a virtual machine, process, or other resource for a limited or defined duration. The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

Further, the network environment 100 comprises data source(s) 108 communicatively coupled with the testing system 102 and the infrastructure elements 104. The data source(s) 108 may comprise information gathered from the various infrastructure elements 104 present in the IT infrastructure and/or from a user. In an example, user preferences for performing testing may be stored in the data source(s) 108. Hereinafter, the testing system 102 may be interchangeably referred to as system 102.

In operations, to perform integration testing of the IT infrastructure, the system 102 may perform initialization by configuring one or more system parameters. In an example, the system 102 may be initialized by configuring necessary parameters for performing testing based on a user input. Once the system initialization is completed, the system 102 may receive one or more infrastructure parameters. In an example, the system 102 may receive the one or more infrastructure parameters from the data source(s) 108. Examples of the one or more infrastructure parameters may include Internet Protocol (IP) address used in the IT infrastructure, port details, protocol information, user credentials, dependencies, type of testing, and an infrastructure area to be tested. In an example, the system 102 may receive infrastructure data from a user. Thereafter, the system 102 may analyze the infrastructure data to obtain the one or more infrastructure parameters.

In an example, the system 102 may probe and identify exposed Transmission Control Protocol/User Datagram Protocol (TCP/UDP) port status of infrastructure elements 104. Network Mapper (Nmap) may be used to probe various TCP/UDP port status. In another example, the system 102 may access the network elements through Secure Shell (SSH) protocol, if the port 22 is open and a user credential is shared.

Further, the system 102 may analyze the one or more infrastructure parameters to identify infrastructure elements 104 in the IT infrastructure. In an example, once the system 102 receives the infrastructure parameters, the system 102 gets access to the infrastructure elements 104, such as physical switches, routers, bridges, computing systems, cloud servers, and databases. Based on the infrastructure parameters, the system 102 identifies an infrastructure topology. The system 102 identifies, such as how many infrastructure elements are presently connected, and how they are interconnected. By logging in to individual devices, switches, and other infrastructure elements 104, the system 102 may identify architecture and scale of the IT infrastructure. For example, the system 102 may login to a web service management console and understand the infrastructure scale and various components along with their configurations. This information may be used by the system 102 to fetch test cases and build test suites for non-functions tests like Performance, Availability, Scalability, Security and integration tests.

Upon identifying the infrastructure elements 104, the system 102 may determine an infrastructure landscape by performing validation operations on the infrastructure elements 104. The infrastructure landscape may indicate a topology of the infrastructure elements 104 in the IT infrastructure and scale of the IT infrastructure. In an example, to determine the infrastructure landscape, the system 102 may run infrastructure specific commands on the infrastructure elements 104. Further, the system 102 may perform test operations at one or more validation points in the IT infrastructure. The validation points may be understood as various stages, such as a setup stage, an execution stage and an output stage. For example, the system 102 may execute commands like "uname—a" to identify operating system (OS). In another example, the system 102 may run a set of predefined commands and tools to identify possible test focus areas based on the usage of infrastructure element 104, OS, and purpose. This may help to pool in right set of tests for the IT infrastructure.

Once the infrastructure landscape is determined, the system 102 may select one or more agnostic test cases from a test case repository (not shown in FIG. 1) based on the infrastructure landscape. The test case repository comprises test cases that are agnostic to the infrastructure. The test cases may be identified early-on and may focus on a particular test areas like network, or performance test. The test cases may be identified based on the test coverage and various infrastructure configurations, and are made as generic as possible. The test cases may be divided based on the test areas and written agnostic to operating systems, and the other infrastructure elements by abstracting the device specific logic in different layers. The test cases are generally provided an Input/output I/O Layer of the system 102 and may be chosen dynamically based on the IT infrastructure and the test area to be tested. In an example, the system 102 may identifying the one or more agnostic test cases agnostic to the at least one infrastructure element 104 with different operating systems (OS) from various manufactures based on a test area. Subsequently, the system 102 may retrieve the one or more agnostic test cases from the test case repository based on the identification.

For example, if the system 102 needs to do the performance test for a network in the OS, then the system 102 may run a specific tool. However, there are different procedures for running specific tools, or sometimes different tools for different OS. The method/sub-routine to execute the tool to analyze the performance can be single one where as it identifies OS and other infrastructure dependencies dynamically and choose the test path accordingly. This way the system 102 may make the test cases generic to various infrastructures and abstract the logic to handle various OS, vendors and the infrastructure elements 104.

The system 102 may then execute the one or more agnostic test cases to perform integration testing of the IT infrastructure. In an example, once the agnostic test cases are executed, the outcome based on the test area may be shared by the system 102 with the specified log levels. Further, based on the issues identified and the confidence obtained, the IT infrastructure may be moved in to production.

Figure 2:
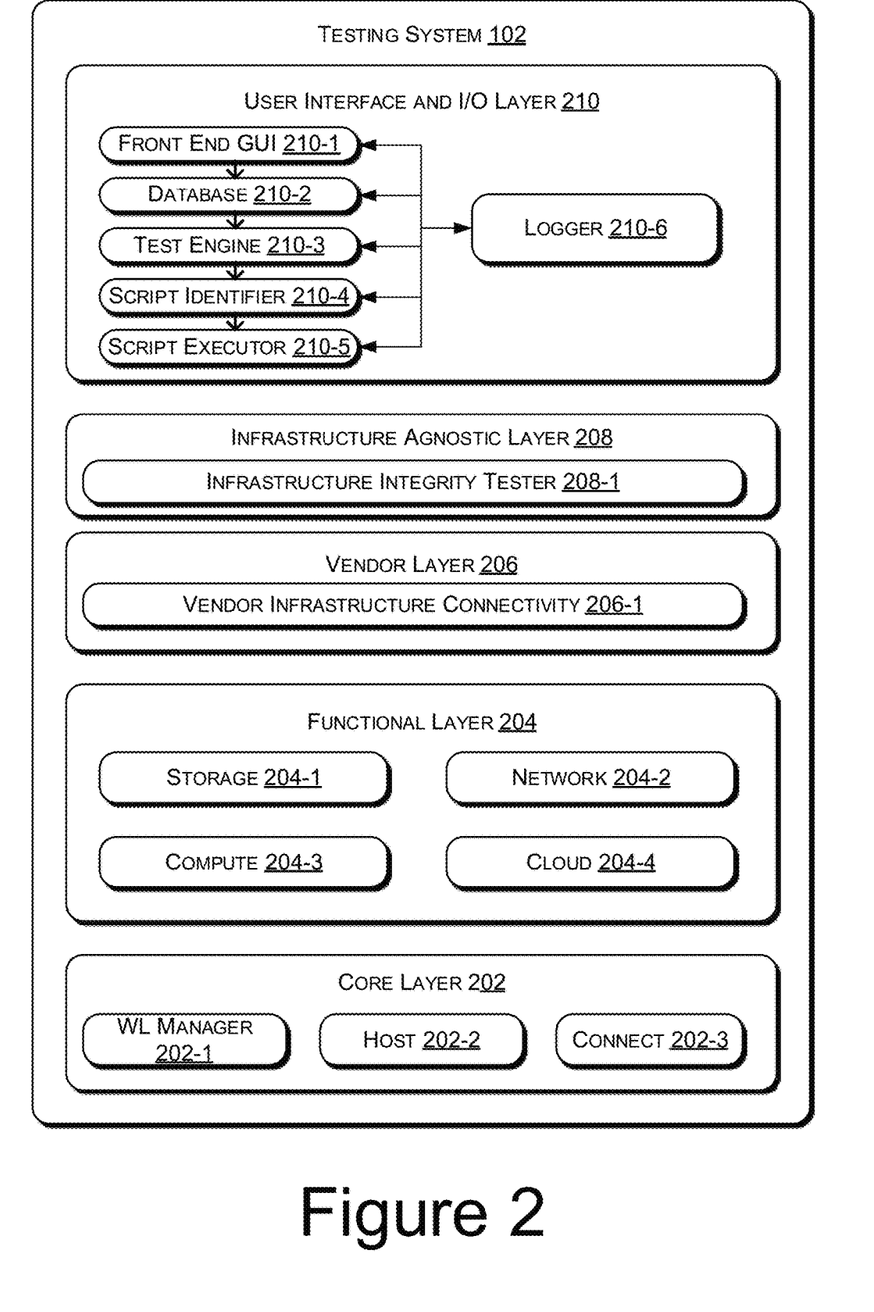
FIG. 2 illustrates an exemplary layer architecture of the testing system, in accordance with some embodiments of the present disclosure.

FIG. 2 illustrates an exemplary layer architecture of the testing system 102, in accordance with some embodiments of the present disclosure. The system 102 is configured to connect, add, and run the test cases on any infrastructure element that is exposed to network though a communication protocol. As shown in FIG. 2, layer architecture of the system 102 comprises five layers: a core layer 202, a functional layer 204, a vendor layer 206, an infrastructure agnostic layer 208, and a user interface & I/O layer 210. Each layer has a particular purpose and role to play in the framework and makes use of the layer below for all the necessities.

As shown in FIG. 2, the core layer 202 comprises three components: worklist (WL Manager 202-1, host 202-2, and a connect 202-3. The WL manager 202-1 helps to run any particular workload on the storage, network, and compute layer. For example: tools that help to test CPU, RAM, or IOzone, Bonnie etc. The host 202-2 helps to build an abstract layer on all the host types. There will be a separate module to handle each host and an abstract layer to cover the common operations on top of that. The connect 202-3 helps to construct an abstract layer on all the connection type. This include various connections methods like, connections made through protocols like SSH, RSH etc., or the connections made though custom APIs.

The functional layer 204 deals with functional areas of test. The areas are broadly divided in to Storage 204-1, Network 204-2, Compute 204-3, and Cloud 204-4. The modules in this layer will have the wrappers over the core layer 202, and may have specific modules to deal with functional scenarios across various vendors. The vendor specific use cases will be handled in the Vendor Layer 206. The function layer 204 may have specific modules with logic to explain the specific functionality agnostic to the vendor. The functional layer 204 may have specific modules to handle various scenarios that are common for Storage 204-1, Network 204-2, Compute 204-3, and Cloud 204-4 independently. In an example, the functional layer 204 may have readily usable sub-routines that are exposed through the module for: file systems tests for New Technology File System (NTFS), third extended filesystem (EXT3) etc., network tests for a physical switch, router or a Network interface controller (NIC), which are agnostic to original equipment manufacturer (OEM), OS level operations, Network File System/Network Attached storage (NFS/NAS) operations etc., and monitoring and security tests.

The vendor layer 206 may comprise module, such as vendor infrastructure connectivity 206-1. The vendor layer 206 deals with vendor specific logic on various test scenarios. For example, how to create a virtual Machine File System (VMFS) in an enterprise server virtualization platform, or how to create Virtual systems management (VSM) in a NetApp filer is specific to vendors. The vendor layer 206 may comprise Application Program Interface (APIs) to deals specific vendors and makes use of the lower layers for connection to the host and running specific scenarios. The test scripts can directly interact with the vendor layer 206 for the vendor specific test scenarios.

The infrastructure agnostic layer 208 comprises an infrastructure integrity tester 208-1. The infrastructure agnostic layer 208 helps to create test scripts agnostic to infrastructure in a defined test area. In an example, how the test is executed or modified according to the host is hidden from an end user.

As shown in FIG. 2, the user interface & I/O handling layer 210 comprises modules, such as a front end graphical user interface (GUI) 210-2, a database 210-2, a test engine 210-3, a script identifier 210-4, a test executor 210-5, and a logger 210-6. At the user interface & I/O handling layer 210, the Java-Fx based GUI 210-1 takes the user input regarding the infrastructure and test areas. This input may be fetched in to the database 210-2 (PostgreSQL), and later this database may be read by the test engine 210-3 as per scheduled scan. Once test engine 210-3 identifies a new test and inputs, the corresponding the tests will be pushed in to a queue and schedule them accordingly. Test engine 210-3 helps to interface between the agnostic layers based on the test script need. It holds a factory of APIs to interface with inner layers of framework, making the test scripting an easy job. The script identifier 210-4 and the script executor 210-5 are responsible for identifying and executing the test scripts, respectively. The logger 210-6 may handle a verbose level logging for the Java based UI, and the python based framework. The same wrapper modules may be used across the framework to ensure a common mode of output logging.

Thus, the present subject matter test and identify potential failures in the IT infrastructure before rolling out the applications into the production. The present subject matter achieves comprehensive test capabilities due to its highly scalable, pluggable, infrastructure agnostic design. The framework disclosed in the present subject matter communicate with individual infrastructure elements 104 and run tests in an agnostic manner, by bringing in a common abstract layer over various infrastructures and vendor specific systems. This framework helps to interact with individual areas of a complex infrastructure and test all of them in segregation or in integration. Further, the present subject matter leverages on the similarity in testing Cloud and Datacenter infrastructure. The test activities include connecting to multiple network, storage and compute elements of cloud and datacenter and make use of similar test scenarios and qualification strategies. Since the test focus areas are agnostic to systems, vendors or infrastructures, it becomes easy to build a comprehensive set of test cases. The present subject matter provides a common platform for faster automation of a test solutions, making use of already existing test scenarios, modules and APIs for connecting to various systems and a common platform of logging, monitoring etc.

Figure 3:
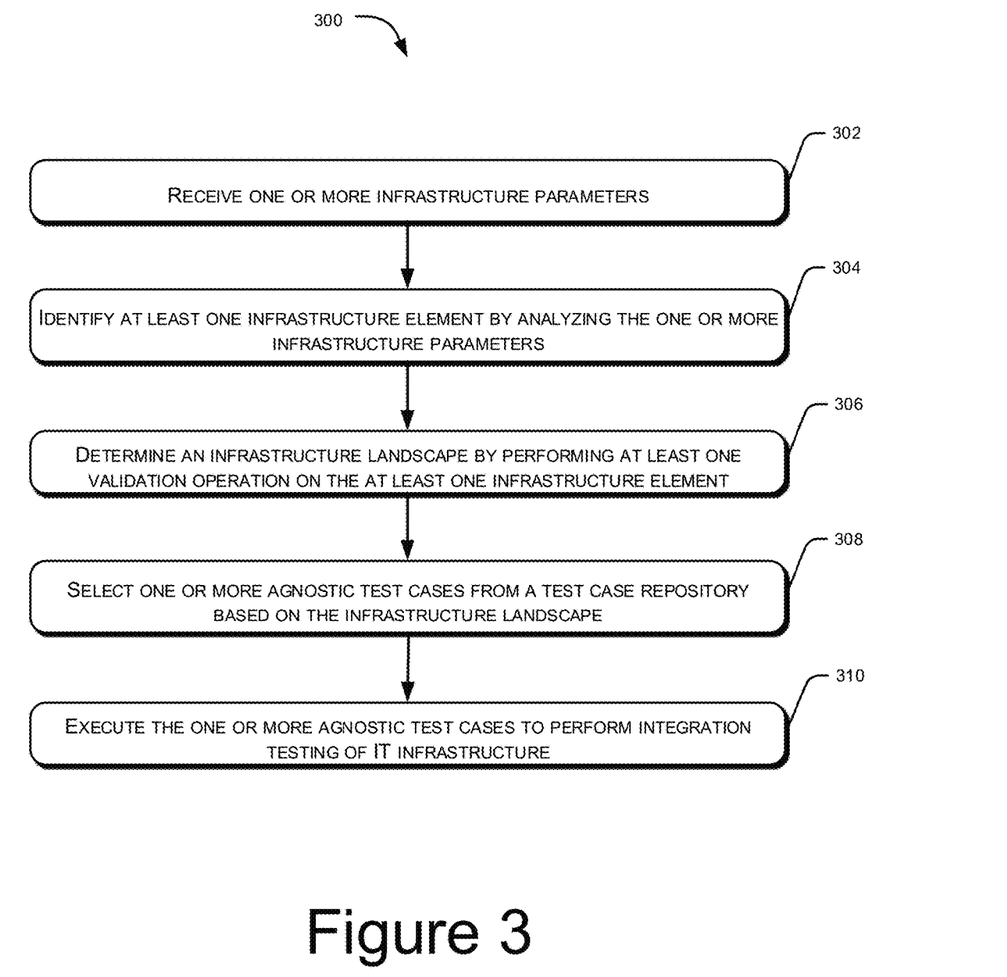
FIG. 3 illustrates an exemplary method for performing integration testing of an IT infrastructure, in accordance with some embodiments of the present disclosure.

FIG. 3 illustrates an exemplary method for performing integration testing of an IT infrastructure, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to FIG. 3, at block 302, one or more infrastructure parameters are received. In an example, the system 102 may receive the infrastructure parameters from the data source 108. In another example, the system 102 may obtain the infrastructure parameters by analyzing infrastructure data received from a user. Examples of the infrastructure parameters may include Internet Protocol (IP) address used in the IT infrastructure, port details, protocol information, user credentials, dependencies, type of testing, and an infrastructure area.

Further, in an example, before receiving the infrastructure parameters, the system 102 may perform system initialization by configuring one or more system parameters based on a user input. The system parameters may indicate the infrastructure elements 104 and a test area to be tested and user preference for performing the testing.

At block 304, at least one infrastructure element 104 is identified by analyzing the one or more infrastructure parameters. Examples of the infrastructure elements 104 may include switches, routers, cloud servers, and computing devices with an operating system (OS). In an example, the system 102 may analyze the infrastructure parameters to determine the infrastructure elements 104 that are part of the IT infrastructure and to be tested for failures/faults.

At block 306, an infrastructure landscape is determined by performing at least one validation operation on the at least one infrastructure element 104. In an example, the system 102 may perform the validation operations to determine the infrastructure landscape. The infrastructure landscape may indicate a topology of the infrastructure elements 104 in the IT infrastructure and/or architecture and scale of the IT infrastructure.

In an example, the system 102 may run infrastructure specific commands on the infrastructure elements 104 to determine the topology of the infrastructure elements 104. In another example, the system 102 may perform test operations at one or more validation points in the IT infrastructure to determine the infrastructure landscape. The validation points may be understood as various stages, such as a setup stage, an execution stage and an output stage.

At block 308, one or more agnostic test cases are selected from a test case repository based on the infrastructure landscape. In an example, the system 102 may communicate with the test repository for extraction of the agnostic test cases. The system 102 may first identify the agnostic test cases that are agnostic to the infrastructure element 104 having different operating systems (OS) from various manufactures. In an example, the system 102 may determine the agnostic test cases based on the test area. Once the agnostic test cases are identified, the system 102 may retrieve the agnostic test cases from the test case repository for execution.

At block 310, the one or more agnostic test cases are executed to perform integration testing of the IT infrastructure. In an example, the system 102 may execute the agnostic test cases to determine failures/faults in the IT infrastructure. In an example, a test report may be generated by the system 102 and provided to the user for further analysis. If there are no issues in the IT infrastructure, the IT infrastructure may be moved in to production phase. In this manner, integration testing of the IT infrastructure is performed in accordance to the present subject matter.

Computer System

Figure 4:
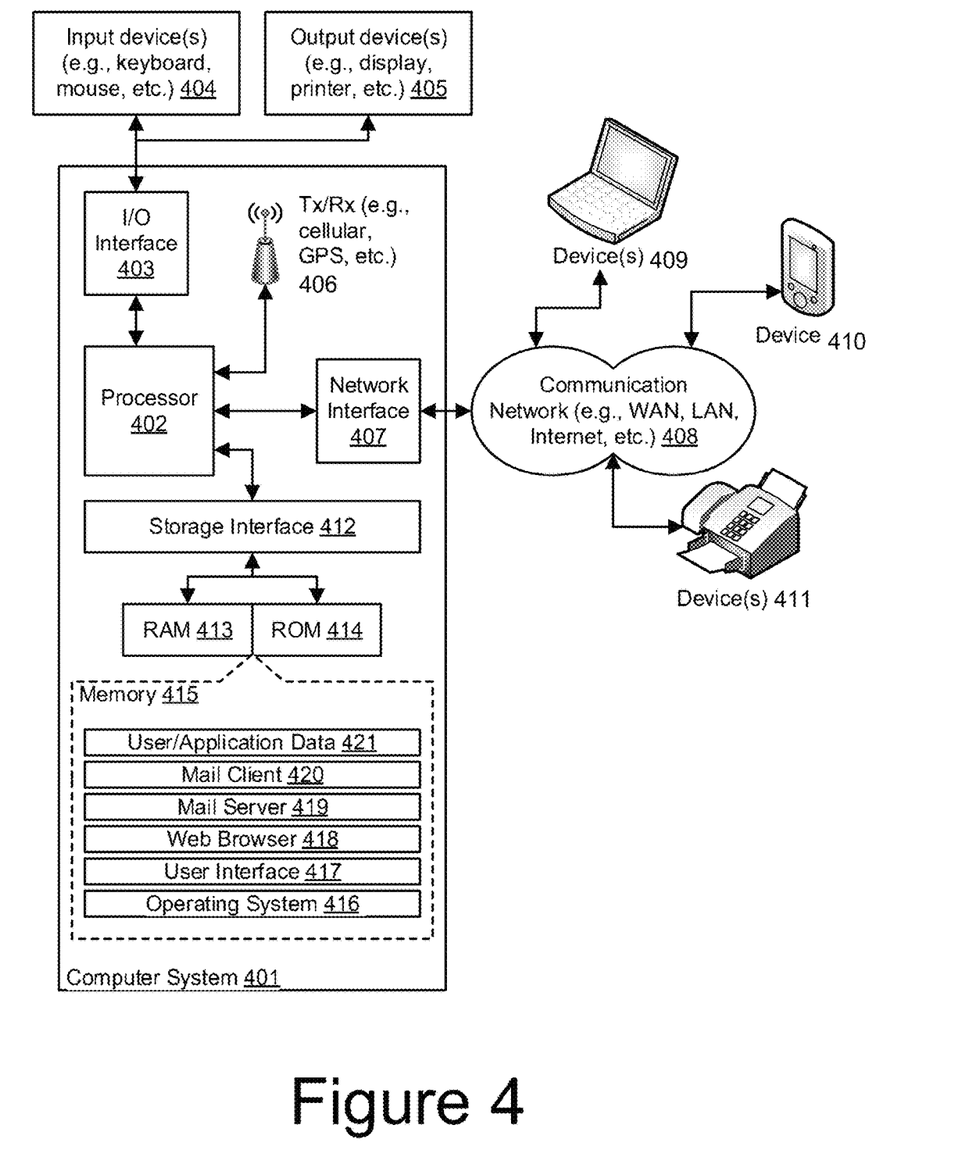
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the testing system 102 presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for performing integration testing of an IT infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing integration testing of Information Technology (IT) infrastructures, the method comprising:
    obtaining, by a testing computing device, one or more infrastructure parameters from at least one data source;
    identifying, by the testing computing device, at least one infrastructure element by analyzing the one or more infrastructure parameters;
    determining, by the testing computing device, an infrastructure landscape by performing at least one validation operation on the at least one infrastructure element, wherein the infrastructure landscape indicates a topology of the at least one infrastructure element in an IT infrastructure;
    selecting, by the testing computing device, one or more agnostic test cases from a test case repository based on the infrastructure landscape; and
    executing, by the testing computing device, the one or more agnostic test cases to perform integration testing of the IT infrastructure.

2. The method of claim 1, wherein the one or more infrastructure parameters comprise an Internet Protocol (IP) address used in the IT infrastructure, port details, protocol information, one or more user credentials, one or more dependencies, a type of testing, or an infrastructure area.

3. The method of claim 1, wherein obtaining the one or more infrastructure parameters further comprises determining the one or more infrastructure parameters by analyzing infrastructure data that pertains to the IT infrastructure and is received from a user.

4. The method of claim 1, wherein the at least one infrastructure element comprises one or more switches, routers, cloud servers, or computing devices with an operating system (OS).

5. The method of claim 1, wherein performing at least one validation operation comprises:
    running infrastructure specific commands on the at least one infrastructure element; and
    performing test operations at one or more validation points in the IT infrastructure, wherein the one or more validation points comprise a setup stage, an execution stage, or an output stage.

6. The method of claim 1, wherein selecting the one or more agnostic test cases further comprises:
    identifying the one or more agnostic test cases that are agnostic to the at least one infrastructure element with different operating systems (OSs) from various manufactures based on a test area; and
    retrieving the one or more agnostic test cases from the test case repository based on the identification.

7. A testing computing device, comprising one or more processors and a
    memory coupled to the one or more processors which are configured to execute one or more programmed instructions comprising and stored in the memory to:
    receive one or more infrastructure parameters from at least one data source;
    identify at least one infrastructure element and analyze the one or more infrastructure parameters;
    determine an infrastructure landscape and perform at least one validation operation on the at least one infrastructure element, wherein the infrastructure landscape indicates a topology of the at least one infrastructure element in an Information Technology (IT) infrastructure;

select one or more agnostic test cases from a test case repository based on the infrastructure landscape; and execute the one or more agnostic test cases to perform integration testing of the IT infrastructure.

8. The testing computing device of claim 7, wherein the one or more infrastructure parameters comprise an Internet Protocol (IP) address used in the IT infrastructure, port details, protocol information, one or more user credentials, one or more dependencies, a type of testing, or an infrastructure area.

9. The testing computing device of claim 7, wherein the one or more processors are further configured to execute one or more additional programmed instructions comprising and stored in the memory to determine the one or more infrastructure parameters and analyze infrastructure data that pertains to the IT infrastructure and is received from a user.

10. The testing computing device of claim 7, wherein the at least one infrastructure element comprises one or more switches, routers, cloud servers, or computing devices with an operating system (OS).

11. The testing computing device of claim 7, wherein the one or more processors are further configured to execute one or more additional programmed instructions comprising and stored in the memory to:

run infrastructure specific commands on the at least one infrastructure element; and perform test operations at one or more validation points in the IT infrastructure, wherein the one or more validation points comprise a setup stage, an execution stage, or an output stage.

12. The testing computing device of claim 7, wherein the one or more processors are further configured to execute one or more additional programmed instructions comprising and stored in the memory to:

identify the one or more agnostic test cases that are agnostic to the at least one infrastructure element with different operating systems (OSs) from various manufactures based on a test area; and retrieve the one or more agnostic test cases from the test case repository based on the identification.

13. A non-transitory computer-readable medium comprising instructions stored thereon for performing integration testing of Information Technology (IT) infrastructures, which when executed by one or more processors, cause the one or more processors to:

receive one or more infrastructure parameters from at least one data source;

identify at least one infrastructure element and analyze the one or more infrastructure parameters;

determine an infrastructure landscape and perform at least one validation operation on the at least one infrastructure element, wherein the infrastructure landscape indicates a topology of the at least one infrastructure element in an IT infrastructure;

select one or more agnostic test cases from a test case repository based on the infrastructure landscape; and execute the one or more agnostic test cases to perform integration testing of the IT infrastructure.

14. The non-transitory computer-readable medium of claim 13, wherein the one or more infrastructure parameters comprise an Internet Protocol (IP) address used in the IT infrastructure, port details, protocol information, one or more user credentials, one or more dependencies, a type of testing, or an infrastructure area.

15. The non-transitory computer-readable medium of claim 13, further comprising one or more additional programmed instructions, which when executed by the one or more processors, further cause the one or more processors to determine the one or more infrastructure parameters and analyze infrastructure data that pertains to the IT infrastructure and is received from a user.

16. The non-transitory computer-readable medium of claim 13, wherein the at least one infrastructure element comprises one or more switches, routers, cloud servers, or computing devices with an operating system (OS).

17. The non-transitory computer-readable medium of claim 13, further comprising one or more additional programmed instructions, which when executed by the one or more processors, further cause the one or more processors to:

run infrastructure specific commands on the at least one infrastructure element; and perform test operations at one or more validation points in the IT infrastructure, wherein the one or more validation points comprise a setup stage, an execution stage, or an output stage.

18. The non-transitory computer-readable medium of claim 13, further comprising one or more additional programmed instructions, which when executed by the one or more processors, further cause the one or more processors to:

identify the one or more agnostic test cases that are agnostic to the at least one infrastructure element with different operating systems (OSs) from various manufactures based on a test area; and retrieve the one or more agnostic test cases from the test case repository based on the identification.

* * * * *